Jan. 5, 1954    J. E. SOCKE    2,665,013
CONTROL MECHANISM FOR ARTICLE TRANSFER DEVICES
Filed June 30, 1948    3 Sheets-Sheet 1

INVENTOR.
John E. Socke
BY Ivan D. Thornburgh
Charles H. Erne
ATTORNEYS

Jan. 5, 1954  J. E. SOCKE  2,665,013
CONTROL MECHANISM FOR ARTICLE TRANSFER DEVICES
Filed June 30, 1948  3 Sheets-Sheet 2
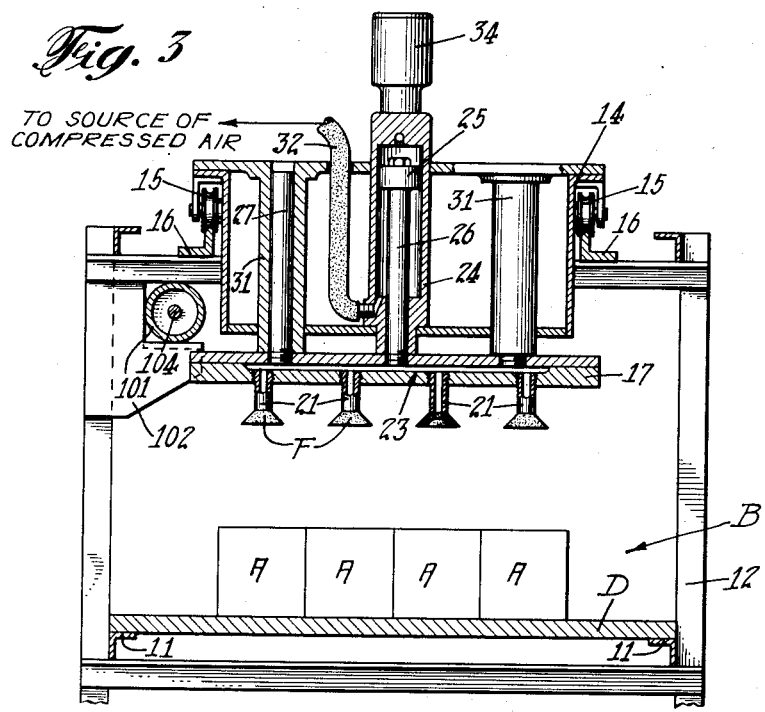
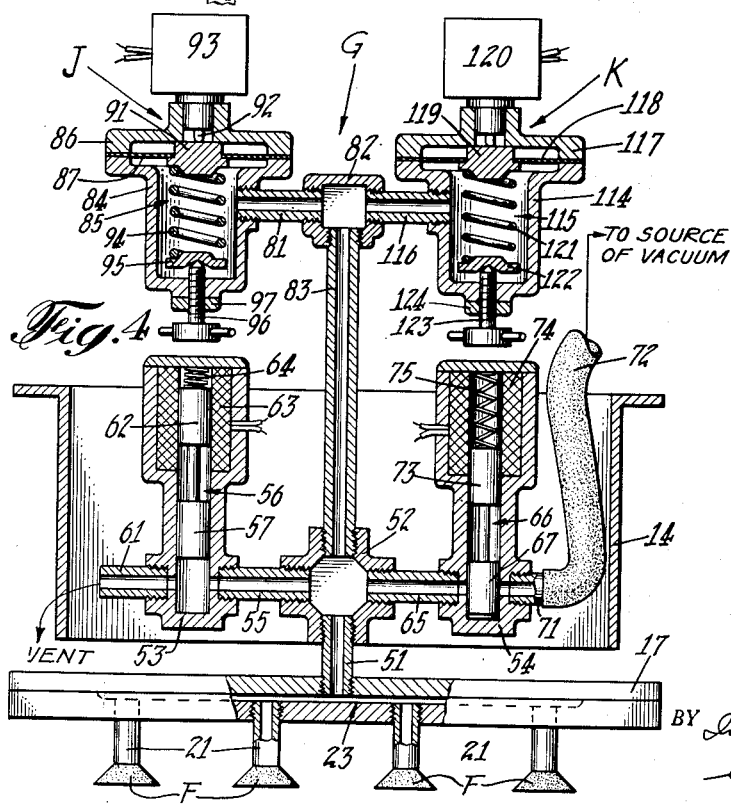
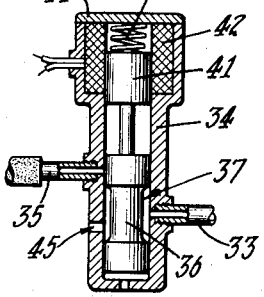
INVENTOR.
John E. Socke
BY Ivan D. Thornburgh
Charles H. Erne
ATTORNEYS

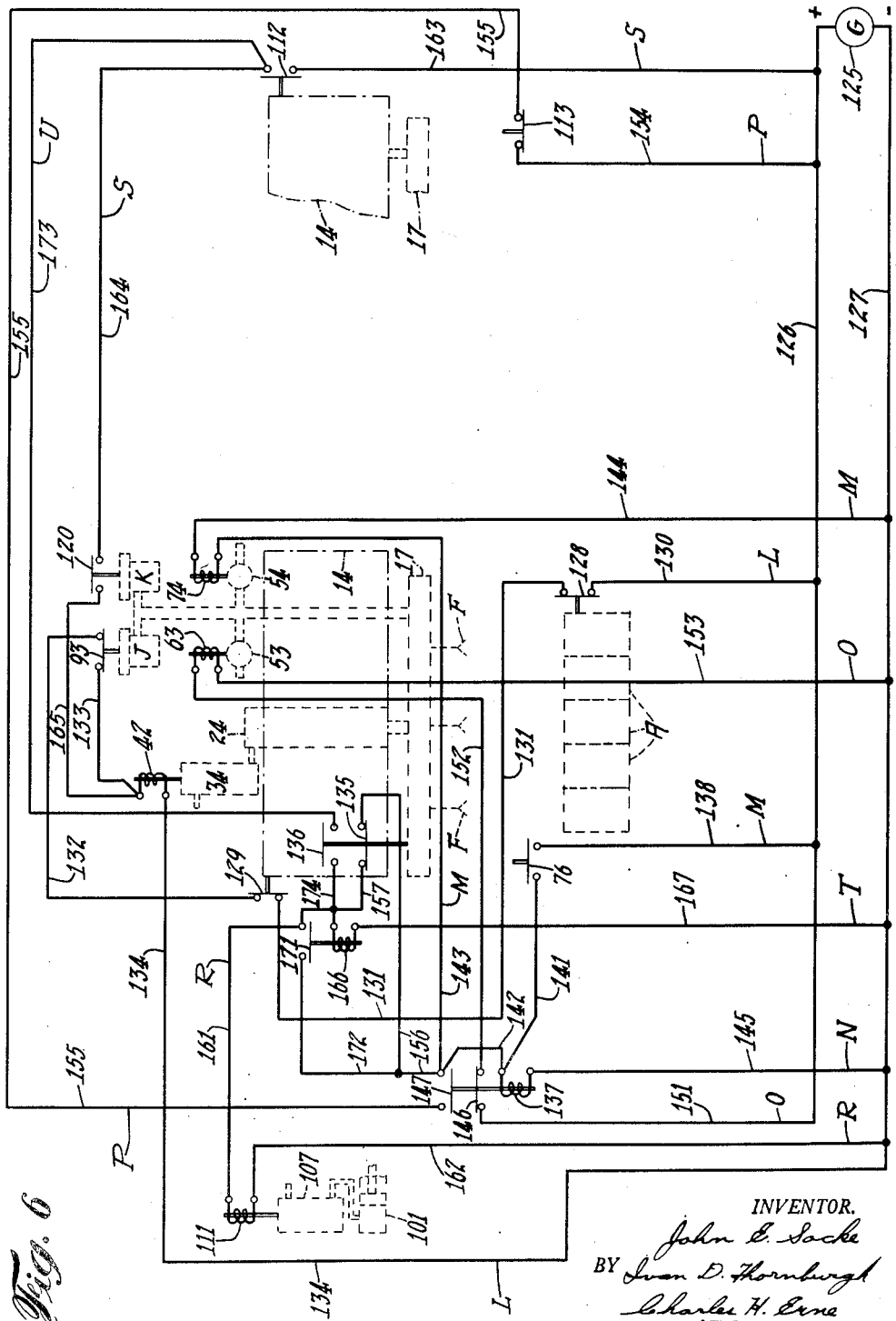

Patented Jan. 5, 1954

2,665,013

UNITED STATES PATENT OFFICE 2,665,013

CONTROL MECHANISM FOR ARTICLE TRANSFER DEVICES

John E. Socke, Pelham Manor, N. Y., assignor to American Can Company, New York, N. Y., a corporation of New Jersey Application June 30, 1948, Serial No. 36,177

9 Claims. (Cl. 214—1)

This invention relates to a machine having transfer devices for transferring articles from one station to another as an incident in treating or performing various operations upon the articles and has particular reference to mechanism for controlling the operation of the transfer devices in accordance with the effective holding of an article prior to its transfer and the full release of the article after its transfer. Reference is here made to my copending United States application Serial Number 36,175, filed June 30, 1948, on Machine for Feeding, Transferring and Compacting Articles Into a Unit Layer, now Patent No. 2,619,237, and to the joint application of John E. Socke and Lloyd H. Weber, Serial Number 36,176, filed June 30, 1948, on Bag Filling or Packing Machine, now Patent No. 2,524,846, issued October 10, 1950.

An object of the invention is the provision of control mechanism in a machine having transfer devices for transferring articles from one station to another wherein the transfer of an article is delayed until the article is securely gripped by the transfer devices to insure positive and safe transfer of the article.

Another object is the provision of control mechanism for such a machine wherein the return of the transfer devices upon delivering a transferred article is delayed until the transferred article is fully released from the transfer devices to insure positive and safe delivery of the transferred article.

Another object is the provision of such a control mechanism wherein a fluid medium is utilized to control the operation of the transfer devices and to simultaneously control the gripping of the articles prior to and during transfer and to release the transferred articles upon delivery after transfer.

Another object is the provision of such a control mechanism wherein adjustment may be made for articles of different weights so that the mechanism may be set for controlling the operation of the transfer devices in accordance with a definite weight of article so as to insure proper gripping of an article to be transferred and proper releasing of a transferred article, in accordance with the weight of the articles being transferred.

Numerous other objects and advantages of the invention will be apparent as it is better understood from the following description, which, taken in connection with the accompanying drawings, discloses a preferred embodiment thereof.

Referring to the drawings:

Fig. 3 is an enlarged sectional view taken substantially along the line 3—3 in Fig. 2 showing details of an air actuated lifter device, with parts broken away;

Fig. 4 is an enlarged sectional view taken substantially along the broken line 4—4 in Fig. 2 and showing the details of a vacuum control mechanism, with parts broken away;

Fig. 5 is an enlarged sectional detail of one of the air valves used in the machine, with parts broken away; and Fig. 6 is a wiring diagram of the electric control system used in the machine.

As an exemplary embodiment of the present invention the drawings illustrate a machine for transferring articles A (Fig. 2) preferably containers or cans, from a receiving station B into a delivery station C as an incident to treating or performing various operations upon the articles.

Figure 2:
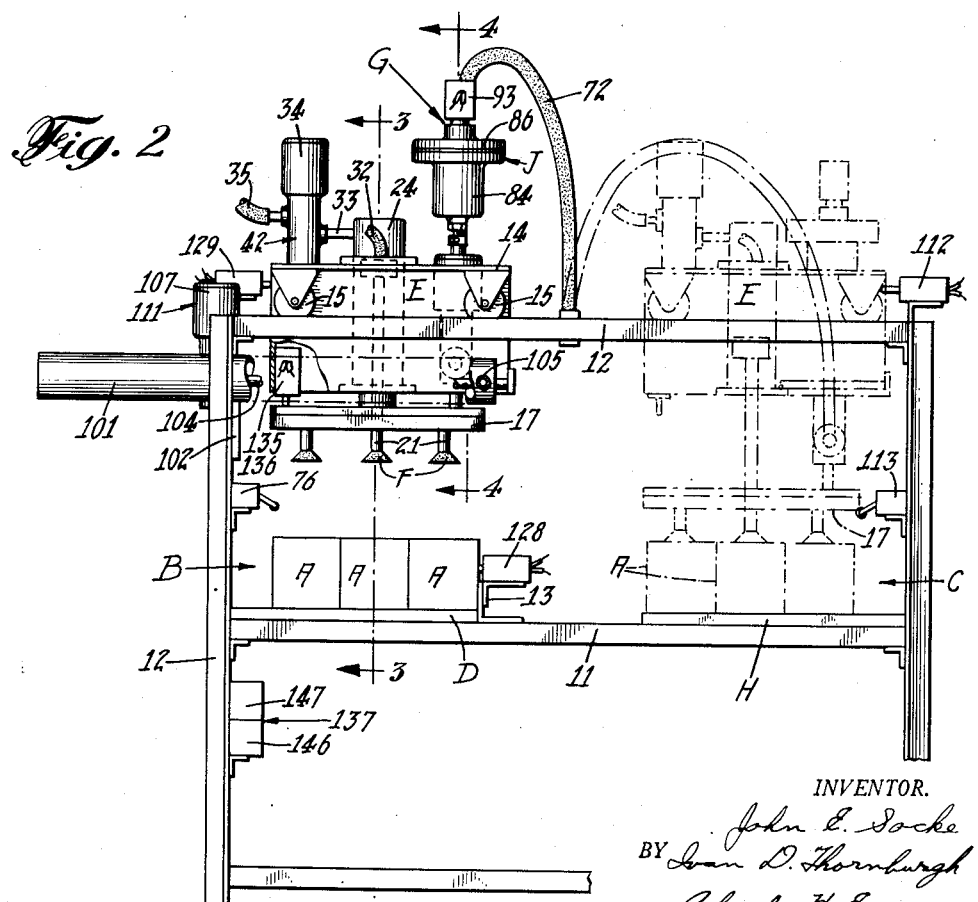
Fig. 2 is a side elevational view of the machine shown in Fig. 1, with parts broken away and with parts in section.

In the machine, the articles A to be transferred, are received, from any suitable source of supply, on a table or receiving platform D located at the receiving station B (as viewed at the left in Fig. 2). At this station the articles are located directly beneath a transfer device E which is movable both vertically and horizontally relative to the stations B, C and which is equipped with gripper elements F. These gripper elements F preferably are vacuumizable cups on which a vacuum is drawn for gripping the articles to be transferred, although the invention is equally well adapted to other gripper elements such as for example those which are operated by other fluid gripper mediums.

In the cycle of operation of the machine the transfer device E first moves vertically downward and engages its gripper cups F against the articles on the platform D. While the transfer device E is in this lowered position its gripper cups F are vacuumized to grip and firmly hold the articles.

Provision is made to insure positive gripping and holding of the articles before the transfer device E again moves. This is brought about through a vacuum control mechanism G (Fig. 4). This mechanism holds the transfer device against movement until a high enough vacuum is created within the gripper cups F to firmly grip and hold the articles. When this predetermined degree of vacuum is reached, the control mechanism operates to permit movement of the transfer device. In this manner the transfer device is prevented from moving without taking the articles with it. The transfer device thereupon moves up to its original position and thus lifts the articles to a position above the receiving platform D.

While a new batch of articles A is being received on the platform D, the transfer device E shifts into the delivery station C, carrying the suspended articles with it and locating them over a delivery table or platform H disposed at the station C. Upon arrival at this station, the transfer device immediately moves down. In this lowered position of the transfer device the vacuum within the gripper cups F is broken to release the articles from the cups and thus deliver the articles onto the table H.

At this point in the cycle of operation of the machine, the control mechanism G again comes into play and prevents the transfer device E from further movement (upward movement) until the vacuum in the gripper cups F is sufficiently dissipated to fully release the articles from the gripper cups. In this manner the transfer device is prevented from moving up again before the articles are fully released from the cups and thereby damage to the articles is prevented by the transfer device prematurely lifting the articles from the table H and releasing them in mid-air when the vacuum is not dissipated fast enough.

When the vacuum within the cups F is dissipated or reduced to a degree sufficient to permit the full release of the articles from the cups, the control mechanism G permits the transfer device E to rise to its original elevation leaving the articles A on the table H. The transfer device then returns or shifts back (toward the left) into the receiving station B for a repeat cycle of operation. During this return movement of the transfer device, the articles transferred onto the delivery table H are operated upon and/or dispsoed of in any suitable manner. This portion of the machine forms no part of the instant invention and therefore its disclosure and description is omitted. This completes the cycle of operation of the machine.

A detailed description of the machine will now be given. The receiving table or platform D (Fig. 2) which supports the articles A is mounted on horizontally disposed support beams 11 which are secured to other vertical and horizontal members forming a unitary structure and providing a frame 12 which constitutes the main frame of the machine. A stop member 13 carried on the support beams 11 and projecting above the table D locates the articles on the table for transfer.

Figure 1:
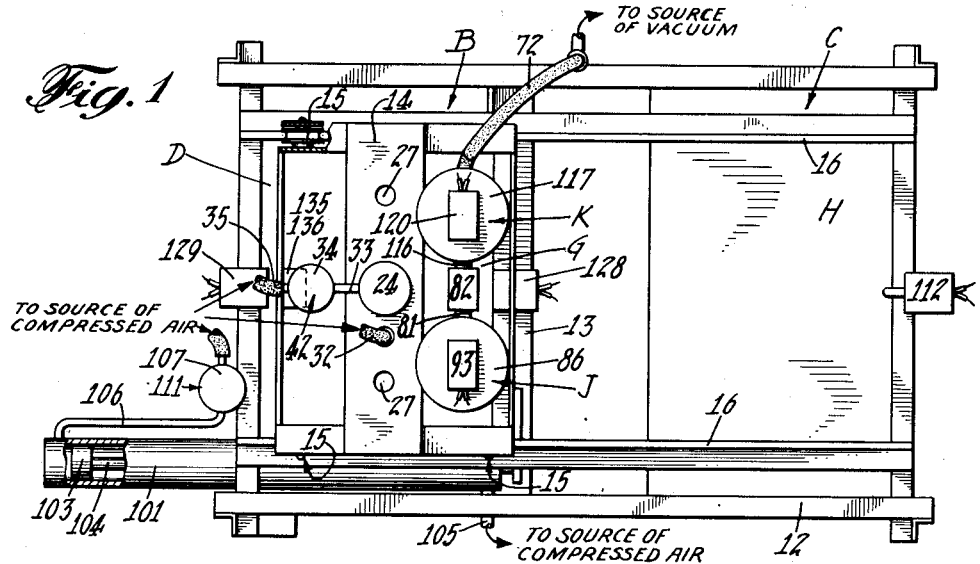
Figure 1 is a top plan view of a machine embodying the present invention, with parts broken away and parts shown in section.

The transfer device E includes a horizontally disposed, rectangular shaped carriage 14 (Figs. 1 and 2) mounted on four rollers 15 which ride on a pair of spaced and parallel tracks 16 secured to the top of the machine frame 12. These tracks extend horizontally of the machine above the receiving platform D and the delivery platform H.

The carriage supports a lifter pad 17 (Figs. 2, 3 and 4) which comprises a pair of flat horizontally disposed upper and lower rectangular plates secured together as a unitary structure and which are movable vertically toward and away from the platforms D and H at their respective stations. The lower plate carries a plurality of depending vacuum tubes or pipes 21 which terminate in the vacuum or gripper cups F hereinbefore mentioned. There is one tube 21 and cup F for each article on the receiving table D. The upper ends of the tubes communicate with interconnected vacuum channels or grooves 23 formed in the top surface of the lower plate of the lifter pad 17.

The lifter pad 17 normally is disposed in an elevated position on the carriage 14 and is moved toward and away from the platforms D and H by compressed air devices which include a vertical closed cylinder 24 (Fig. 3) supported on and movable with the carriage. The cylinder contains a piston 25 mounted on a piston rod 26 which extends down through the cylinder and is secured in the upper plate of the lifter pad. Pilot or guide pins 27 secured in the upper plate of the lifter pad extend up through sleeves 31 secured to the carraige 14 and guide the lifter pad 17 against turning during its vertical travel.

Compressed air is continuously introduced into the cylinder 24 adjacent its lower end by an inlet pipe 32 (Figs. 1 and 3) which leads from any suitable source of air under pressure. This air exerts its force against the lower face of the piston 25 and thus holds the pad in its uppermost position (Fig. 3). This is the normal position of the lifter pad.

Vertical movement of the lifter pad 17 is effected by compressed air which is introduced into the cylinder 24 at its upper end above the piston 25, through a pipe 33 (Figs. 1 and 2) which is connected into the cylinder 24 and into a normally closed lifter valve 34. This valve is connected by a pipe 35 to the source of air under pressure. The pipe 35 is spaced above the pipe 33 as shown in Fig. 5.

The flow of air through the valve 34 is controlled by a valve slide 36 disposed within the valve and formed with an annular by-pass groove 37. This valve slide 36 is connected to a core 41 of a normally de-energized electric solenoid 42 mounted in the valve 34. A compression spring 43 interposed between the end of the core 41 and a cover plate 44 of the valve retains the valve slide 36 in its normal closed position as shown in Fig. 5. In this position the valve slide cuts off the supply of air from the supply pipe 35 and maintains its groove 37 in communication with the inlet pipe 33 and with a vent port 45 formed in the valve 34 just below the pipe 35.

When the solenoid 42 is energized it draws its core 41 and the valve slide 36 upward in the valve 34 and this closes the vent port 45 and opens the supply pipe 35 to communication with the inlet pipe 33. Hence compressed air from the pipe 35 passes through the valve by-pass groove 37, and the pipe 33 into the cylinder 24 and exerts its force against the upper face of the piston. Since this upper face is greater in area than the lower face by an amount equal to the area of the piston rod, the air above the piston pushes the piston down in its cylinder. This action lowers the lifter pad 17 and thus moves the vacuum cups F down onto the articles A on the receiving platform D.

As soon as the lifter pad 17 reaches the bottom of its stroke, and the vacuum cups F engage the articles A, a vacuum is drawn on the cups F for the purpose of gripping the articles for a subsequent lifting action with the lifter pad to remove the articles from the platform D as hereinbefore mentioned. The vacuumizing of the vacuum cups F is brought about by a cup venting and vacuumizing mechanism supported on a vertically disposed combination vent and vacuum tube 51

(Fig. 4) projecting up from and movable with the lifter pad 17. The lower end of the tube is threadedly secured in the upper plate of the lifter pad and communicates with the interconnected vacuum channels 23 in the lower plate.

The upper end of the vent vacuum tube 51 supports a cross type pipe fitting 52 on which a normally open solenoid actuated vent valve 53 (Fig. 4) and a normally closed solenoid actuated vacuum valve 54 are carried. The normally open vent valve 53 is connected by and is supported on a short pipe 55 threadedly secured in the fitting 52. The valve 53 is formed with a bore 56 in which a valve slide 57 operates. Opposite the pipe 55, the valve bore 56 communicates with a short vent tube 61 which is secured in the valve casing and which is open to the atmosphere. The valve slide 57 at its upper end is connected to a core 62 of a normally energized electric solenoid 63 enclosed in the valve casing. The core is maintained under pressure of a compression spring 64 interposed between the upper end of the core and the top of the valve casing. The normally energized solenoid keeps the slide valve 57 in a raised position as shown in Fig. 4 and thus normally admits the outside air through the vent tube 61, vent valve 53, pipe 55, fitting 52, vent-vacuum tube 51 and channels 23 leading to the vacuum cups F.

The normally closed vacuum valve 54 is connected by and is supported on a short pipe 65 also threadedly secured in the fitting 52 (Fig. 4). The valve 54 is formed with a bore 66 in which a valve slide 67 operates. Opposite the pipe 65, the valve bore 66 communicates with a vacuum pipe 71 which is secured in the valve casing. The outer end of this vacuum pipe is connected to a flexible connector 72 leading to any suitable source of vacuum. Communication between the vacuum pipe 71 and the pipe 65 is normally cut off by the vacuum valve slide 67 in the valve bore 66. This valve slide 67 is connected at its upper end to a core 73 of a normally de-energized electric solenoid 74 enclosed in the valve casing. The core is maintained under pressure of a compression spring 75 interposed between the upper end of the core and the top of the valve casing.

Upon reaching the bottom of its downward stroke the lifter paid 17 engages and operates an electric switch 76 (Fig. 2) for starting the operation of the venting and vacuumizing mechanism. The switch 76 is connected in suitable electric circuits, to be hereinafter explained in connection with the wiring diagram and the operation of this switch immediately de-energizes the vent solenoid 63 and simultaneously energizes the vacuum solenoid 74 of the venting and vacuumizing mechanism. The vent valve 53 thereupon closes and cuts off communication between the outside atmosphere and the gripper cups F through the fitting 52. At the same time, the vacuum valve 54 opens and establishes communication between the gripper cups F and the vacuum supply pipe 71. Thus the vacuum cups F, by way of the channels 23 in the lifter pad 17 and the vent vacuum tube 51 connecting with these channels and the fitting 52 are subjected to the vacuum pull in the vacuum pipe 71 and are thus vacuumized, with the result that they grip the articles A disposed on the platform D.

The vacuumizing of the gripper cups F also effects the operation of the control mechanism G which holds the lifter pad 17 in its lowered position until a predetermined high degree of vacuum, sufficient to lift the articles A as hereinbefore mentioned, is created in the gripper cups F. For this purpose the control mechanism G includes a high vacuum diaphragm control device J (Fig. 4) which is in communication with the gripper cups F and with the venting and the vacuumizing mechanism hereinbefore described. The control device J is mounted above the vent valve 53 (Fig. 4) on a pipe 81 secured in a T type fitting 82 mounted on the upper end of a vertical pipe 83 which at its lower end is secured in the fitting 52.

The control device J includes a vertically disposed housing 84 having a chamber 85 which is closed and sealed by a cover 86. A flexible and yieldable diaphragm 87 is secured in the joint between the housing and the cover. This diaphragm carries a button 91 the upper surface of which engages against a movable switch element 92 of a normally closed electric switch 93 carried on the cover 86. This switch is connected through a suitable circuit with the normally deenergized valve solenoid 42 which controls the lifting of the lifter pad 17 as will be more fully explained hereinafter. The button 91 is held normally against the cover 86, to keep the switch 93 closed, by a counterpressure compression spring 94 which is located within the housing 84 and is interposed between the button 91 and a retaining member 95. This retaining member is seated on the upper or inner end of a manually operated adjusting screw 96 which is threadedly secured in the bottom of the housing 84.

Thus by manually adjusting the screw 96, the counterpressure of the spring 94 against the diaphragm 87 may be changed and set at a predetermined amount. After an adjustment of the counterpressure on the spring, the screw may be locked in position by a lock nut 97 threadedly attached to the screw. The adjustment of the pressure on the diaphragm is made in accordance with the weight of the articles A being handled in the machine so that when a vacuum high enough to lift the articles, is created in the vent-vacuum system, the vacuum pull on the diaphragm will overcome the pressure of the spring.

Hence when the vacuum is drawn on the cups F, to grip the articles A, it is simultaneously drawn on the diaphragm 87. When this vacuum reaches a degree high enough to correspond with the setting of the spring 94, it pulls or flexes the diaphragm downwardly against the counterpressure of the spring. This flexing of the diaphragm permits the switch 93 to open and thus breaks the circuit containing the lifter solenoid 42. The solenoid thereby becomes de-energized. In this manner control of the movement of the lifter pad 17 is effected to insure positive picking up of the articles A before the pad begins its lifting action.

The de-energizing of the lifter solenoid 42 permits the valve 34 to close and thus cut off the supply of compressed air into the upper end of the air cylinder 24 (Figs. 3 and 5). This action also uncovers the vent opening 45 and thus releases the compressed air in the upper end of the cylinder to the atmosphere. Hence, the constant supply of compressed air in the lower end of the cylinder 24 moves the piston 25 through its return or upward stroke to its original position, thus raising the lifter pad 17 with the gripped articles A held in suspension above the platform D as hereinbefore mentioned.

When the lifter pad 17 reaches the top of its return stroke and is in its normal raised position, the transfer carriage 14 is shifted to the right (as viewed in Fig. 2) along the rails 16 from its location over the platform D to a position over the platform H. During this movement of the transfer carriage and the pad 17 carried thereby, the vacuum is maintained on the vacuum cups F to hold the articles A in suspended position.

Movement of the transfer carriage 14 is effected preferably by compressed air which is introduced into a long horizontally disposed closed transfer cylinder 101 (Figs. 1, 2 and 3) which is located adjacent the path of travel of the carriage and which is mounted on a bracket 102 secured to the main frame 12. This cylinder contains a piston 103 (Fig. 1) which is connected to a long piston rod 104, the opposite end of which is bolted to the carriage 14.

In the cylinder 101 as in the lifter pad cylinder 24, compressed air from any suitable source of supply is continuously introduced into the piston rod end of the cylinder by way of a pipe 105 (Figs. 1 and 2) to normally maintain the carriage in a predetermined position over the platform D. The opposite end of the cylinder receives compressed air from the same source of supply by way of a pipe 106 (Fig. 1) which connects with a control valve 107. This valve is operated by a normally de-energized electric solenoid 111 and is similar to the valve 34 (Fig. 5) and its solenoid 42.

Hence when the solenoid 111 is energized it opens its valve 107 and this permits compressed air to enter the outer end of the cylinder 101 in front of the piston 103 and thus forces the piston toward the right (as viewed in Fig. 2). The movement of the piston shifts the carriage 14 into the delivery station C as illustrated by the dot and dash lines in Fig. 2.

When the carriage 14 comes to rest over the platform H at the delivery station C, the lifter pad 17 and the suspended articles A are moved down to deposit the articles on the table or platform H. This is effected by reenergizing the lifter pad solenoid 42 (Fig. 5) of the valve 34. The re-energizing of the solenoid opens the valve 34 and thus admits compresed air from the supply pipe 35 into the upper end of the lifter pad actuating cylinder 24. This air forces the piston 25 and the lifter pad 17 downwardly toward the table or platform H.

When the articles A are fully seated on the table or platform H the vacuum maintained within the vacuum cups F is dissipated to release the articles from the cups. This breaking of the vacuum is effected by the opening of a normally closed electric switch 113 (Fig. 2) which is engaged by the lifter pad 17 as it approaches the bottom of its downward stroke. The switch is connected to the solenoids 63, 74 (Fig. 6) of the venting and vacuumizing mechanism hereinbefore mentioned. When this switch is opened, the de-energized solenoid 63 becomes energized and this opens the vent valve 53 and permits air at atmospheric pressure to enter the mechanism and thus break the vacuum. Simultaneously with this action, the energized solenoid 74 becomes de-energized and this closes the vacuum valve 54 and thus cuts off the mechanism from the source of vacuum.

The dissipation of the vacuum in the vent-vacuum mechanism also affects the diaphragm control device J connected therewith and thus permits the spring 94 in the device to return the diaphragm 87 to its normal position. This recloses the electric switch 93 (Fig. 4) for a a repeat operation.

In order to insure full release of the articles A from the gripper cups F before the lifter pad 17 returns to its elevated position, as hereinbefore mentioned, the lifter pad is restrained from lifting until the vacuum in the vent-vacuum mechanism has dropped or has been reduced to a degree which is insufficient to hold the articles on the gripper cups F. This is brought about by a low vacuum diaphragm control device K (Fig. 4) which is a part of the control mechanism G.

The control device K (Fig. 4) is similar to the control device J and comprises a vertically disposed housing 114 having a chamber 115 which is connected to and communicates with the T type fitting 82 and the control device J and the vent-vacuum mechanism attached thereto, by a short pipe 116 secured in the fitting. The chamber 115 is closed and sealed by a cover 117 secured to the housing 114. A flexible and yieldable diaphragm 118 is secured in the joint between the housing and the cover. This diaphragm carries a button 119, the upper surface of which engages against a movable element of a normally open electric switch 120 carried on the cover 117. This switch is connected through suitable circuits with the valve solenoid 42 which controls the lifting of the lifter pad 17.

The button 119 is held normally against the cover 117, to keep the switch 120 open, by a counterpressure compression spring 121 which is located within the housing 114 and is interposed between the button 119 and a retaining member 122. This retaining member is seated on the upper or inner end of a manually operated adjusting screw 123 which is threadedly secured in the bottom of the housing 114.

Thus by manually adjusting the screw 123, the counterpressure of the spring 121 against the diaphragm 118 may be changed and set at a predetermined amount. After an adjustment of the pressure on the spring, the screw may be locked in position by a lock nut 124 threadedly attached to the screw. The adjustment of the pressure on the diaphragm is made in accordance with the weight of the articles A being handled in the machine so that a relatively low vacuum in the chamber 115, insufficient to hold the articles A on the gripper cups A, will likewise be insufficient to overcome the counterpressure of the spring 121 and will thus permit the diaphragm 118 to flex upwardly into its normal position.

The counterpressure spring 121 in the housing 114 is comparatively lighter than the counterpressure spring 94 in the housing 84 and hence does not exert as much pressure on the diaphragm 118 as that exerted by spring 94 on the diaphragm 87.

When a vacuum is created in the vent-vacuum mechanism to grip and hold the articles A on the gripper cups F, this vacuum affects the control device K as well as the control device J and hence both diaphragms 87, 118 of these devices are drawn down simultaneously against the pressure of their respective counterpressure springs 94, 121. Thus when the diaphragm 87 opens its switch 93, the diaphragm 118 simultaneously closes its switch 120. However, the switch 120 is part of a normally open circuit and the closing of this switch only partially closes the circuit without effect on the solenoid 42 included therein.

Thus all the while the vacuum is maintained in the gripper cups F to hold the articles A attached thereto, the normally open switch 120 is actually closed. The circuit is completely closed through the closing of a normally open electric switch 112 which is closed by the carriage 14 when it moves into the delivery station C. It is the closing of this switch 112 and its circuit which includes the closed switch 120 that re-energizes the valve solenoid 42 and thereby lowers the lifter pad 17 to permit the deposit of the articles A onto the delivery platform H.

Hence when the vacuum in the vent-vacuum mechanism is broken to release the articles from the gripper cups F, it is simultaneously broken in the chamber 115 of the control device K. However the lifter pad 17 cannot return immediately to its elevated position, until the switch 120 is opened and the circuit connecting with the solenoid 42 is broken to de-energize this solenoid. This condition is brought about only when the vacuum in the gripper cups F and in the chamber 115 has dropped to such a low degree that the articles A are entirely free or released from the cups. When this low degree of vacuum, which corresponds to the setting of the counterpressure spring 121, is reached, the pressure of the spring overcomes the pull of the vacuum and this flexes the diaphragm 118 upwardly into its normal position as shown in Fig. 4. This upward flexing of the diaphragm opens the switch 120 and breaks its circuit as explained above and thus de-energizes the solenoid 42. In this manner control of the movement of the lifter pad 17 is effected to insure positive release of the articles A from the lifter before the pad begins its return stroke.

De-energization of the solenoid 42 actuates the air valve 34 as previously described and thus immediately supplies compressed air to the lower end of the cylinder 24 for raising the lifter pad 17 up from the released articles A, leaving the articles deposited on the platform H (Fig. 2).

As soon as the lifter pad 17 returns to its elevated normal position, the carriage 14 returns to its normal position over the platform D as shown in full lines in Fig. 2, in readiness for a repeat cycle of operations on the next batch of articles being placed on the platform D. This return movement of the carriage 14 is effected by a de-energizing of the energized solenoid 111 (Fig. 2) of the transfer cylinder 101. De-energizing of the solenoid closes the valve 107 and cuts off the supply of compressed air entering the outer end of the cylinder and vents this end of the cylinder to the atmosphere. This permits the constant air pressure on the inner end of the cylinder to force the piston 103 and the carriage 14 connected therewith, toward the left as viewed in Fig. 2. It is this action that returns the carriage to its original starting position over the platform D. This completes the cycle of operation of the machine.

Reference should now be had to the wiring diagram in Fig. 6 which schematically shows electric equipment for controlling and operating the various solenoids and switches hereinbefore mentioned. The cycle of operation of the machine is started by an electric starting circuit L which like all the other circuits to be hereinafter described are connected with and receive electric current from a generator circuit which includes a generator 125 having a main lead wire 126 and a return lead wire 127.

The starting circuit L includes a normally open starting switch 128 mounted on the stop member 13 at the receiving station B, a normally closed carriage switch 129 mounted on the main frame 12, the normally closed vacuum control lift switch 93 and the lifter valve solenoid 42. When the articles A are received on the receiving platform D and are located against the stop member 13 they also engage against the starting switch 128 and close it.

Electric current from the generator 125 passing along the main lead wire 126 also passes along the circuit L, along a connecting wire 130, through the closed switch 128, a connecting wire 131, closed carriage switch 129, a connecting wire 132, closed vacuum switch 93, a connecting wire 133, the lifter valve solenoid 42, returning along a connecting wire 134 to the return lead wire 127.

Electric current passing along the circuit L energizes the lifter valve solenoid 42 and thus opens the valve to permit compressed air to flow into the lifter cylinder 24 and thus lower the lifter pad 17 and its vacuum cups F into engagement with the articles A on the platform D as hereinbefore explained. As soon as the lifter pad 17 starts to move down it opens a normally closed switch 135 mounted on the carriage 14 and closes an integrally formed normally open switch 136 having a common switch element which engages against the upper surface of the lifter pad. The actuation of these switches performs no function at this time, their effect on the various circuits being reserved for a later period in the cycle of operation.

When the descending lifter pad 17 reaches the bottom of its stroke and engages the articles A, it also engages and closes the normally open switch 76 hereinbefore mentioned. Closing of this switch does two things. It establishes a vacuumizing circuit M which includes the normally de-energized vacuumizing solenoid 74 of the vent-vacuum mechanism and also closes a relay circuit N which includes a normally de-energized relay solenoid 137. In the vacuumizing circuit M electric current passes from the generator lead wire 126 along a wire 138, through the closed switch 76, along connecting wires 141, 142, 143 to and through the vacuumizing valve solenoid 74 and returns along a wire 144 to the return lead wire 127. This current energizes the vacuum valve solenoid 74 and thus opens the vacuumizing valve 54 (Fig. 4) to vacuumize the cups F in engagement with the articles A.

Current passing along this vacuumizing circuit M also passes along the relay circuit N, the current passing from the wire 141 through the relay solenoid 137 and returns along a conecting wire 145 to the return lead wire 127. Current passing along this circuit N energizes the relay solenoid 137 and thereby opens a normally closed relay switch 146 included in a vent circuit O and also closes a normally open relay switch 147 included in a vacuum holding circuit P.

In the vent circuit O, electric current from the generator lead wire 126 normally passes along a wire 151, through the closed relay switch 146, along a connecting wire 152 to and through the normally energized venting valve solenoid 63 of the vent-vacuum mechanism and returns along a wire 153 to the return lead wire 127. When the relay switch 146 opens, it breaks this circuit O and thereby de-energizes the venting valve solenoid 63. This closes the vent valve 53 (Fig. 4) as hereinbefore explained and cuts off the atmosphere to the system so that the vacuum cups F can be vacuumized.

Since the vacuum pull on the cups F and their engaged articles A is maintained while the lifter pad 17 lifts the containers off the platform D and transfers them to the table or platform H, provision is made for holding the relay solenoid 137 energized when the lifter pad 17 rises and thereby releases and opens the switch 76. It is for this purpose that the vacuum holding circuit P is established by the closing of the relay switch 147. When this switch is closed electric current from the generator lead wire 126 passes along a wire 154 (at the right in Fig. 6) through the normally closed switch 113, along a wire 155, through the closed relay switch 147, along wire 142, through the energized relay solenoid 137, returning along wire 145 of the circuit N to the return lead wire 127. This current maintains the relay solenoid 137 in its energized condition.

When a predetermined or sufficiently high amount of vacuum is created in the vacuum lines connecting with the vacuum cups F to assure the gripping and holding of the articles A so that they may be raised with the lifter pad 17, the high vacuum diaphragm control J functions to open the normally closed vacuum lift switch 93. This opens and thereby breaks the starting circuit L to the solenoid 42 of the air valve 34. The breaking of this circuit operates the air valve 34 (Fig. 5) to allow air to enter the lower end of the cylinder 24 while venting the upper part for effecting the lifting of the lifter pad 17 and the articles A held by the cups F, from the platform D. As the articles A rise from the platform D they move away from and release and open the starting switch 128 of the starting circuit L for a repeat cycle of operation.

When the lifter pad 17 reaches the top of its stroke, holding the articles A in suspension, it engages and closes the switch 135 and opens its cooperating switch 136. Closing of the switch 135 establishes a circuit R which is an extension of the circuit P and which is utilized for the purpose of shifting the transfer carriage 14 forward for transferring the suspended articles A into a position over the delivery platform H. The circuit R includes the normally de-energized solenoid 111 of the carriage air valve 107 which admits air into the transfer cylinder 101 for actuating the carriage.

Tracing the flow of current through the combined circuits P and R, the current passes from the generator lead wire 126 along the wire 154 of circuit P (at the right in the diagram Fig. 6), through the closed switch 113, along wire 155, through closed relay switch 147, along a wire 156 of circuit R, through the closed switch 135, along a wire 157 and a connecting wire 161 to and through the carriage solenoid 111 returning along a wire 162 to the return lead wire 127. Current passing along this circuit energizes the solenoid 111 and thus opens the air valve 107 and effects the shifting of the carriage 14 to its forward position (as viewed at the right in Fig. 2).

As the carriage 14 begins its shifting it moves away from the stationary switch 129 at the left of the carriage and this opens the switch and insures against re-energizing the lifter pad solenoid 42 during movement of the carriage. When the carriage 14 reaches its forward position over the delivery platform H (Fig. 2) it engages and closes the normally open switch 112.

The closing of the switch 112 establishes a circuit S which includes the lifter solenoid 42 and the normally closed vacuum release switch 120 of the diaphragm control device K. The switch 120 remains closed as long as sufficient vacuum is maintained in the system to hold the articles A against the vacuum cups F. The circuit S is utilized to re-energize the lifter solenoid 42 to open the air valve 34 (Fig. 5) and thus lower the lifter pad 17 and the articles A toward the delivery table or platform H. For this re-energizing operation electric current from the generator lead wire 126 passes along a wire 163 of circuit S (extreme right in the diagram Fig. 6) through the closed switch 112, a wire 164, through the closed switch 128, along a connecting wire 165, through the solenoid 42, returning along wire 134 to the return lead wire 127.

In order to prevent breaking of the circuit R so as to hold the carriage solenoid 111 energized and to maintain the carriage 14 in its forward position over the delivery platform H when the lifter pad 17 moves down and away from the switch 135 and again opens it, a relay holding circuit T is provided which by-passes the control switch 135. This circuit receives electric current from the wire 157 of circuit R the current passing through a relay solenoid 166, returning along a wire 167 to the return lead wire 127. Current passing along this circuit energizes the relay solenoid 166 and thereby closes a normally open relay switch 171 actuated by this solenoid.

The closing of the relay switch 171 establishes the by-pass portion of the circuit T and provides for the continued energization of the carriage solenoid 111 during the interval when the switch 135 is opening and the switch 136 is closing, during which interval both switches are open. In this by-pass portion of the circuit T, current from the wire 156 of the circuit R passes along a connecting wire 172, through the closed relay switch 171, wire 161, carriage solenoid 111 and wire 162 to the return lead wire 127. Current also passes from the closed relay switch 171 along the wire 157 to and through the relay solenoid 166 and wire 167 to the return lead wire 127 to maintain the relay solenoid 166 energized and the relay switch 171 closed.

When the lifter pad 17 descends far enough to close the switch 136 a new holding circuit U is formed which includes the switch 136 and which cuts out the relay switch 171 for the purpose of subsequently breaking the carriage solenoid 111. Current for this circuit U is received from the circuit S, the current passing from the generator lead wire 126 along the wire 163 and through the closed switch 112 of circuit S, then along a wire 173 of circuit U, through the closed switch 136, along a wire 174 and wires 157, 161 to and through the carriage solenoid 111 and along wire 162 to the return lead wire 127.

When the lifter pad 17 reaches the bottom of its down stroke and deposits the articles A on the delivery table or platform H, the vacuum in the vacuum cups F is broken to release the articles A therefrom and to leave them on the table. This is effected by the pad at the bottom of its stroke engaging against and opening the switch 113 in circuit P. This breaks the circuit P and that portion of circuit N which includes the relay solenoid 137. The solenoid 137 thereupon becomes de-energized and this returns the relay switch 146 to its normally closed condition and simultaneously returns the relay switch 147 to its normally open condition.

Opening of the relay switch 147 breaks that portion of circuit R which leads into the by-pass portion of circuit T and thus de-energizes the relay solenoid 166 and opens the relay switch 171 in circuit T. Thus the sole current supply for the carriage solenoid 111 is now through switch 136 of circuit U. The opening of the relay switch 147 also breaks the circuit M and this de-energizes the vacuum solenoid 74 and closes the vacuum valve 54 (Fig. 4). This cuts off the source of vacuum.

The simultaneous closing of the relay switch 146, re-establishes the broken venting circuit O including the venting solenoid 63 and this re-energizes the solenoid and opens the venting valve 53 (Fig. 4). The vacuum system, including the vacuum cups F is thereupon vented to the outside atmosphere and the vacuum is broken. The vacuum then begins to fall from its high setting controlled by the high vacuum diaphragm control device J and thus this device is actuated as previously described. This effects the closing of the vacuum lift switch 93 in the starting circuit L but has no effect at this time except to partially re-establish the circuit upon the return of the carriage 14 to its normal position over the receiving platform D, since switch 129 in this circuit is still open.

As the vacuum within the system continues to drop, the desired low vacuum setting as controlled by the diaphragm control device K is reached at which time the articles A are released from the cups F as previously described and the low vacuum diaphragm control device K performs its function and opens the vacuum release switch 120, thereby breaking the circuit S to the solenoid 42. This de-energizes the solenoid 42. De-energizing of the solenoid 42 closes the air valve 34 (Fig. 4) and vents the lifter pad cylinder 24 previously described, thus causing the lifter pad 17 to move upwardly away from the delivery table H, leaving the released articles A on the table.

As the lifter pad 17 moves up out of engagement with the open switch 113, this switch closes, thus partially re-establishing the circuit P for a repeat cycle of operation.

When the rising lifter pad 17 reaches the top of its stroke, against the carriage 14, it engages and returns the switch 135 to its normally closed condition and simultaneously returns the switch 136 to its normally open condition. Closing of the switch 135 partially reestablishes the circuit R for the next cycle of operation. However, the opening of the switch 136 breaks the circuit U and that portion of circuit R that includes the carriage solenoid 111 and thus de-energizes this solenoid. De-energizing of the solenoid 111 closes the air valve 107 and thus cuts off the supply of air to the carriage cylinder 101. This permits the carriage 14 to return to its normal position over the receiving platform D where it engages and closes the open switch 129 for the next cycle of operation. This completes the cycle of operation of the electric circuits and devices used in the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for transferring articles from one station to another, the combination of a transfer device movable between said stations, gripper means on said transfer device and operable for gripping an article at one of said stations and for holding it during transfer into another of said stations for release at said other station, and a control mechanism operable by a fluid gripper medium under pressure and effective on said gripper means for gripping and releasing said article; said control mechanism including a diaphragm control device comprising a sealed housing for receiving said fluid gripper medium, a flexible diaphragm located in said housing and having one face exposed to said gripper medium, said diaphragm being yieldable under the pressure of said medium, pressure means exerting a counterpressure against said diaphragm for controlling the flexure of said diaphragm, and means operable by said diaphragm when it flexes and governing the movement of said transfer device relative to said stations as an incident to gripping and releasing an article at said stations.

2. In a machine for transferring articles from one station to another, the combination of a transfer device movable between said stations, gripper means on said transfer device and operable for gripping an article at one of said stations and for holding it during transfer into another of said stations for release at said other station, and a control mechanism operable by a fluid gripper medium under pressure and effective on said gripper means for gripping and releasing said article, said control mechanism including a diaphragm control device comprising a sealed housing for receiving said fluid gripper medium, a flexible diaphragm located in said housing and having one face exposed to said gripper medium, said diaphragm being yieldable under the pressure of said medium, pressure means exerting a counter-pressure against said diaphragm for controlling the flexure of said diaphragm, means operable by said diaphragm when it flexes and governing the movement of said transfer device relative to said stations as an incident to gripping and releasing an article at said stations, and means for changing the counterpressure on said diaphragm in accordance with the weight of the article to be handled for changing the effectiveness of said gripper medium on said diaphragm and on said gripper means to accommodate said control device and said gripper means to an article of a different weight.

3. In a machine for transferring articles from one station to another, the combination of a transfer device movable between said stations, gripper means on said transfer device and operable for gripping an article at one of said stations and for holding it during transfer into another of said stations for release at said other station, and a control mechanism operable by a fluid gripper medium under pressure and effective on said gripper means for gripping and releasing said article, said control mechanism including a pair of diaphragm control devices, each of said devices comprising a sealed housing for receiving said fluid gripper medium, a flexible diaphragm located in said housing and having one face exposed to said gripper medium, said diaphragm being yieldable under the pressure of said medium, pressure means exerting a counter-pressure against said diaphragm for controlling the flexure of said diaphragm, means operable by said diaphragm when it flexes, said means in one of said control devices governing the movement of said transfer device relative to one of said stations as an incident to gripping an article at said station before its transfer, said means in the other of said control devices governing the movement of said transfer device during the release of said article at another of said stations to insure full release of the article after its transfer and before further movement of said transfer device.

4. In a machine for transferring articles from one station to another, the combination of a transfer device movable between said stations, suction cup gripper means on said transfer device for engaging an article at one of said stations and for holding it during transfer into the other station, a control mechanism carried in part by said transfer device and having connection with a source of vacuum for making said gripper means effective and ineffective for holding and releasing said article, said control mechanism including pressure responsive means exposed to and actuated by a predetermined degree of vacuum for delaying movement of said transfer device with the article held by said gripper means until said predetermined degree of vacuum is reached, to insure a secure hold on said article, and means located at the second of said stations and actuated by said transfer device for engaging said control mechanism for breaking said vacuum to release said article from said gripper means.

5. In a machine for transferring articles from a receiving station to a delivery station, the combination of a transfer device movable between said stations, gripper means including suction cups on said transfer device for engaging an article at said receiving station and for holding it during transfer into said delivery station, a control mechanism carried in part by said transfer device and having connection with a source of vacuum for making the vacuum effective or ineffective on said gripper means for gripping and releasing said article, said control mechanism including pressure responsive means exposed to and actuated by a predetermined degree of vacuum for delaying movement of said transfer device into said delivery station until said gripper means has established a secure hold on said article, a switch located at said delivery station and engageable by said transfer device to actuate said control mechanism for breaking said vacuum to release said article from said gripper means, and means for adjusting said pressure responsive means to vary the effectiveness of said gripper means when a different predetermined degree of vacuum is employed for holding an article of a different weight.

6. In a machine for transferring articles from one station to another, the combination of a carriage movable between said stations, a lifter pad mounted on said carriage and movable therewith, means for moving said lifter pad relative to said carriage, suction cups on said lifter pad for engaging articles at one of said stations, vacuum means connecting with said suction cups for holding the engaged articles on said cups, and a control mechanism including a flexible diaphragm exposed to said vacuum means and connected to said lifter pad moving means, said diaphragm being responsive to a predetermined degree of vacuum drawn on said suction cups to actuate said lifter pad moving means to elevate said pad with its held articles after said predetermined degree of vacuum is effective in said cups to insure their secure hold on said articles.

7. In a machine for transferring articles from a receiving station to a delivery station, the combination of a carriage movable between said stations, means for moving said carriage in opposite directions to and from said stations, a lifter pad mounted on said carriage and movable therewith, means for moving said lifter pad relative to said carriage, suction cups on said lifter pad for engaging articles at said receiving station, vacuum means connecting with said suction cups for holding the engaged articles on said cups, a control mechanism including a flexible diaphragm exposed to said vacuum means and connecting with said carriage moving means, said diaphragm being responsive to a predetermined degree of vacuum drawn on said suction cups for delaying the operation of said lifter pad actuating means to prevent premature movement of said pad with its held articles, said control mechanism being further operative to delay operation of said carriage moving means until said predetermined degree of vacuum is effective in said suction cups to insure a secure hold on said articles, and means located at said delivery station and actuated by said carriage after movement of the carriage into said delivery station for energizing said control means to break said vacuum and release said articles from said cups.

8. In a machine for transferring articles from a receiving station to a delivery station, the combination of a transfer device, means for moving said transfer device between stations, a source of vacuum, a suction cup on said transfer device and connected to said vacuum source for gripping an article at said receiving station and for holding it during movement of said transfer device into said delivery station, a vacuum control mechanism carried on said transfer device and including a vacuum valve and a vent valve for respectively making the vacuum effective and ineffective on said gripper means for gripping and releasing said article, said control mechanism further including a pair of flexible diaphragms responsive to said source of vacuum for respectively actuating said vacuum and vent valves, an electric circuit connecting said vacuum and vent valves and said transfer moving means, and a plurality of electrical switch means in said electric circuit and operable in accordance with the position of said gripper means and said transfer device relative to said article, one of said switch means being actuated by one of said diaphragms to open said vacuum valve and to simultaneously close said vent valve to grip an article by said suction cup at said receiving station, another of said switch means being thereafter actuated by said transfer device to actuate said moving means to move said transfer device with its gripped article into said delivery station, still another of said switch means being thereafter actuated by the other of said diaphragms to close said vacuum valve and simultaneously open said vent valve to release said article from said suction cup, and a final of said switch means being thereafter actuated by said transfer device to actuate said moving means to return said transfer device to said receiving station.

9. In a machine for transferring articles from one station to another station, the combination of a transfer device movable between said stations, means for moving said transfer device from one station to the other, gripper means carried by said transfer device, vacuum means effective on said gripper means for rendering said gripper means operative for gripping an article at said one station for transfer therefrom and for rendering said gripper means inoperative to release the article at said another station after transfer of the article thereto, means responsive to fluid pressure operable by said vacuum means and effective on said moving means to delay movement of said transfer device until said gripper means have been rendered fully operative to insure a secure hold on said article before its transfer, and to delay further movement of said transfer device after transfer of the article until said gripper means have been rendered fully inoperative to insure full release of the transferred article, and movable means at each of said stations engageable by said gripper means to actuate said vacuum means for the respective purposes described.

JOHN E. SOCKE.

References Cited in the file of this patent

UNITED STATES PATENTS

| Number | Name | Date |
|---|---|---|
| 1,532,255 | Miller | Apr. 7, 1925 |
| 1,834,499 | Richter | Dec. 1, 1931 |
| 2,247,787 | Schmidt | July 1, 1941 |
| 2,253,283 | Minaker | Aug. 19, 1941 |
| 2,359,433 | McNamara | Oct. 3, 1944 |
| 2,609,108 | Peterson et al. | Sept. 2, 1952 |